United States Patent
Naito et al.

(10) Patent No.: US 11,349,143 B2
(45) Date of Patent: May 31, 2022

(54) FUEL CELL STACK

(71) Applicant: HONDA MOTOR CO., LTD., Tokyo (JP)

(72) Inventors: Hideharu Naito, Wako (JP); Kosuke Takagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 206 days.

(21) Appl. No.: 16/747,662

(22) Filed: Jan. 21, 2020

(65) Prior Publication Data

US 2020/0235418 A1   Jul. 23, 2020

(30) Foreign Application Priority Data

Jan. 23, 2019  (JP) .............................. JP2019-008992

(51) Int. Cl.
| | |
|---|---|
| *H01M 8/2475* | (2016.01) |
| *H01M 8/0267* | (2016.01) |
| *H01M 8/0273* | (2016.01) |
| *H01M 8/1004* | (2016.01) |
| *H01M 8/2457* | (2016.01) |

(52) U.S. Cl.
CPC ....... *H01M 8/2475* (2013.01); *H01M 8/0267* (2013.01); *H01M 8/0273* (2013.01); *H01M 8/1004* (2013.01); *H01M 8/2457* (2016.02)

(58) Field of Classification Search
CPC . H01M 8/0267; H01M 8/2457; H01M 8/2475
USPC ....................................................... 429/469
See application file for complete search history.

(56) References Cited

U.S. PATENT DOCUMENTS

| | | | |
|---|---|---|---|
| 2015/0251560 A1* | 9/2015 | Ishikawa ............. | H01M 8/2457 180/232 |
| 2016/0226092 A1 | 8/2016 | Nishiyama et al. | |
| 2017/0263968 A1* | 9/2017 | Naito ..................... | B60L 50/71 |
| 2018/0366761 A1 | 12/2018 | Ohmori et al. | |

FOREIGN PATENT DOCUMENTS

| | | | | |
|---|---|---|---|---|
| CN | 102820494 A | * | 12/2012 | ............ H01M 50/20 |
| JP | 2016-143545 | | 8/2016 | |
| JP | 2017016770 A | * | 1/2017 | |
| JP | 2019-003830 | | 1/2019 | |

OTHER PUBLICATIONS

Japanese Office Action for Japanese Patent Application No. 2019-008992 dated Nov. 4, 2020.

* cited by examiner

*Primary Examiner* — James M Erwin
(74) *Attorney, Agent, or Firm* — Amin, Turocy & Watson, LLP

(57) ABSTRACT

A fuel cell stack includes a plurality of power generation cells and a stack case. A tab protrudes from an outer marginal portion of each of the power generation cells. The stack case contains the plurality of power generation cells that are stacked together in a stacking direction, and includes a pair of end plates provided at both ends of the power generation cells in the stacking direction. Further, the fuel cell stack includes a support bar extending inside the stack case in the stacking direction, and including a recess capable of accommodating the tab. One end of the support bar is joined to one of the end plates, and the other end of the support bar is supported by the other of the end plates.

6 Claims, 6 Drawing Sheets

FUEL CELL STACK

CROSS-REFERENCE TO RELATED APPLICATION

This application is based upon and claims the benefit of priority from Japanese Patent Application No. 2019-008992 filed on Jan. 23, 2019, the contents of which are incorporated herein by reference.

BACKGROUND OF THE INVENTION

Field of the Invention

The present invention relates to a fuel cell stack formed by stacking a plurality of power generation cells together.

Description of the Related Art

As described in Japanese Laid-Open Patent Publication No. 2016-143545, the fuel cell stack includes a stack body formed by stacking a plurality of power generation cells together for performing power generation partially consuming a fuel gas and an oxygen-containing gas. Each of the power generation cells includes a membrane electrode assembly (MEA) and a pair of separators sandwiching the MEA. The MEA is formed by stacking an anode, an electrolyte membrane, and a cathode together. The separators are bipolar plates.

Further, the separator disclosed in Japanese Laid-Open Patent Publication No. 2016-143545 includes tabs which protrude outward, in its outer peripheral portion. The tabs are accommodated in recesses of coupling members (support bars) extending between a pair of end plates. In the structure, when a load is applied to the fuel cell stack, the tabs are brought into engagement with the support bars, and positional displacement between the separators is prevented. Further, the support bars are joined to of the end plates provided at both ends of the stack body in the stacking direction, respectively, to apply a tightening load to a plurality of power generation cells through the end plates.

SUMMARY OF THE INVENTION

The present invention has been made in relation to the technique of supporting the stack body formed by stacking the plurality of power generation cells as described above, and an object of the present invention is to provide a fuel cell stack in which it is possible to simplify the support bar to a greater extent.

In order to achieve the above object, according to an aspect of the present invention, a fuel cell stack is provided. The fuel cell stack includes a stack body including a plurality of power generation cells each having a tab, the tab protruding from an outer marginal portion of each of the power generation cells, a stack case containing the plurality of power generation cells that are stacked together in a stacking direction, and including a pair of end plates provided at both ends of the stack body in the stacking direction, a support bar extending inside the stack case in the stacking direction, and including a recess configured to accommodate the tab, the stack body being held between the pair of end plates in a manner that a tightening load is applied to the stack body, wherein one end of the support bar in the stacking direction is joined to one of the end plates, and another end of the support bar in the stacking direction is supported by another of the end plates.

In the fuel cell stack, one end of the support bar is joined to one of the end plates, and the other end of the support bar is supported by the end plate. In the structure, it is possible to achieve structure where the support bar does not receive the tightening load to the plurality of power generation cells. That is, when the fuel cell stack receives a load, the support bar is engaged with the tabs of the power generation cells to have a dedicated function of suppressing lateral displacement of the separators of the power generation cells. In the structure, it is possible to simplify the support bar to a greater extent, and for example, it becomes possible to reduce the rigidity of the support bar to achieve weight reduction.

The above and other objects features and advantages of the present invention will become more apparent from the following description when taken in conjunction with the accompanying drawings in which a preferred embodiments of the present invention is shown by way of illustrative example.

DESCRIPTION OF THE PREFERRED EMBODIMENTS

Hereinafter, a preferred embodiment of the present invention will be described in detail with reference to the accompanying drawings.

Figure 1:
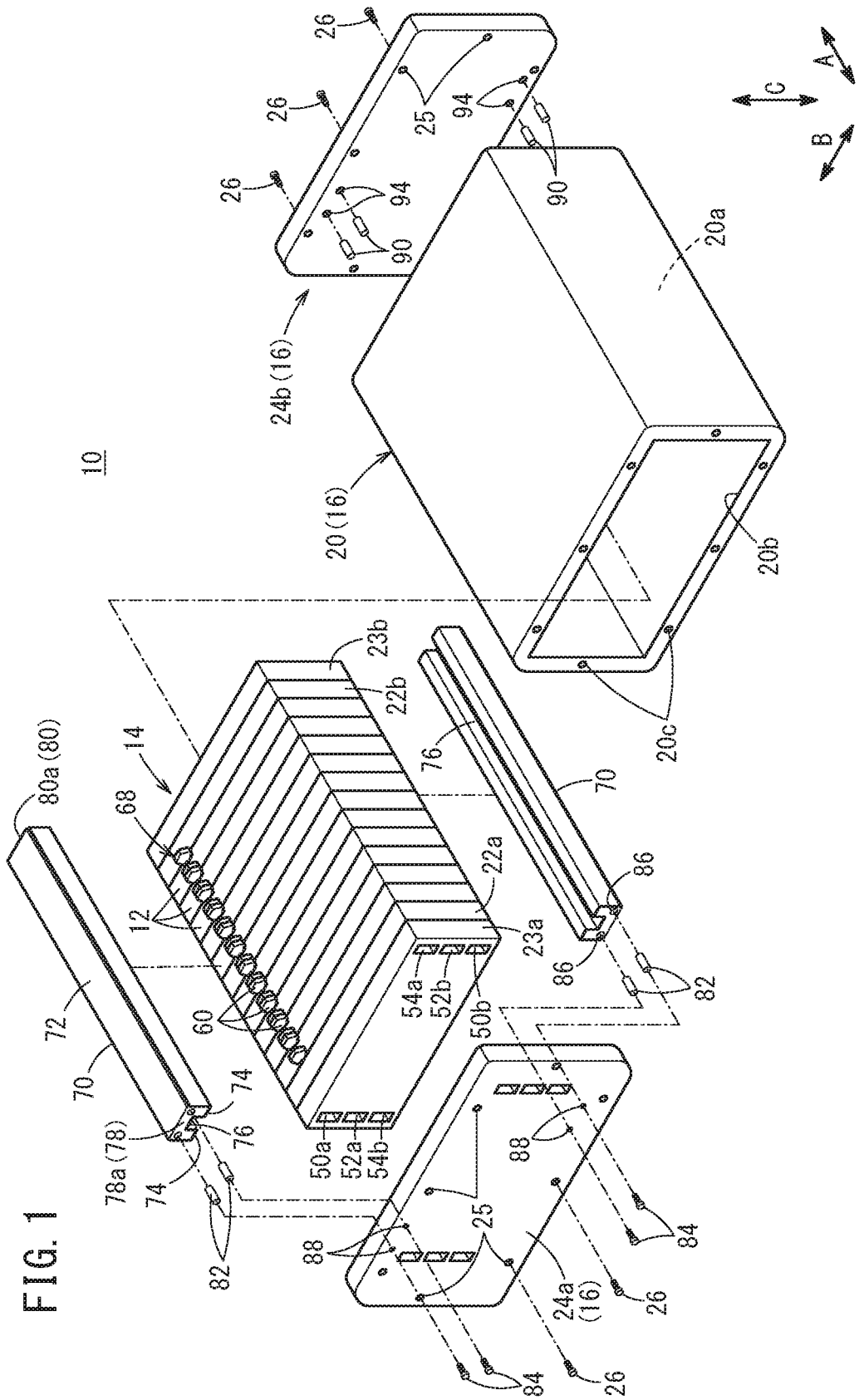
FIG. 1 is an exploded perspective view showing overall structure of a fuel cell stack according to an embodiment of the present invention.

As shown in FIG. 1, a fuel cell stack 10 according to an embodiment of the present invention includes a plurality of power generation cells 12 as units of fuel cells. The plurality of power generation cells 12 are stacked together in a horizontal direction indicated by an arrow A to form a stack body 14. In use, for example, the fuel cell stack 10 is mounted in a fuel cell automobile (not shown). It should be noted that, in the state where the stack body 14 is mounted in the fuel cell automobile, the plurality of power generation cells 12 may be stacked together in the gravity direction indicated by an arrow C.

For the purpose of mounting the stack body 14 in the fuel cell automobile, the fuel cell stack 10 includes a stack case 16 containing the stack body 14. Further, pipes, auxiliary devices (devices), etc. for a fuel cell system (not shown) including the fuel cell stack 10 are coupled to one end of the stack case 16.

The stack case 16 includes a rectangular cylindrical case body 20 having a storage space 20a, and a pair of end plates 24a, 24b for closing both ends of the case body 20. The case body 20 is in the form of a one-piece structural object including a ceiling plate, a pair of side plates, and a bottom plate that are formed integrally by extrusion, casting, etc. Open sections 20b are provided at both ends of the case body 20 in an axial direction indicated by the arrow A. The open sections 20b are connected to the storage space 20a. A plurality of body side screw holes 20c are formed in both end surfaces of the case body 20 around the open sections 20b. The case body 20 may be formed by joining a ceiling plate, a pair of side plates, and a bottom plate as separate component parts, together.

In the storage space 20a, at one end of the plurality of power generation cells 12 in the stacking direction indicated by the arrow A, a terminal plate 22a is provided. An insulator 23a is disposed outside the terminal plate 22a. At the other end of the plurality of power generation cells 12 in the stacking direction, a terminal plate 22b is provided. An insulator 23b is disposed outside the terminal plate 22b.

Then, an end plate 24a is disposed at one end of the stack body 14 including the terminal plate 22a and the insulator 23a in the stacking direction. An end plate 24b is disposed at the other end of the stack body 14 including the terminal plate 22b and the insulator 23b in the stacking direction.

A plurality of fastening holes 25 are provided in each of the pair of end plates 24a, 24b. The plurality of fastening holes 25 face the plurality of body side screw holes 20c of the case body 20. At the time of assembling the fuel cell stack 10, bolts 26 are inserted through the fastening holes 25, and screwed with the body side screw holes 20c. Thus, the end plates 24a, 24b are fixed to the case body 20. At the time of assembling the fuel cell stack 10, seal members 27 (see FIGS. 4 to 6) for preventing leakage of gases are disposed between the case body 20 and the end plates 24a, 24b.

In the fuel cell stack 10 having the above structure, the stack body 14 is held between the pair of end plates 24a, 24b such that a tightening load in the stacking direction indicated by the arrow A is applied from the case body 20 to the stack body 14 through the pair of end plates 24a, 24b. For example, adjustment of the tightening load is made by adjusting the thickness of the insulators 23a, 23b or determining the layout of shims. By this tightening load, in the plurality of power generation cells 12 which form the stack body 14, leakage, etc. of reactant gasses during power generation is suppressed, and a suitable surface pressure is applied to power generation surfaces of the power generation cells 12.

Figure 2:
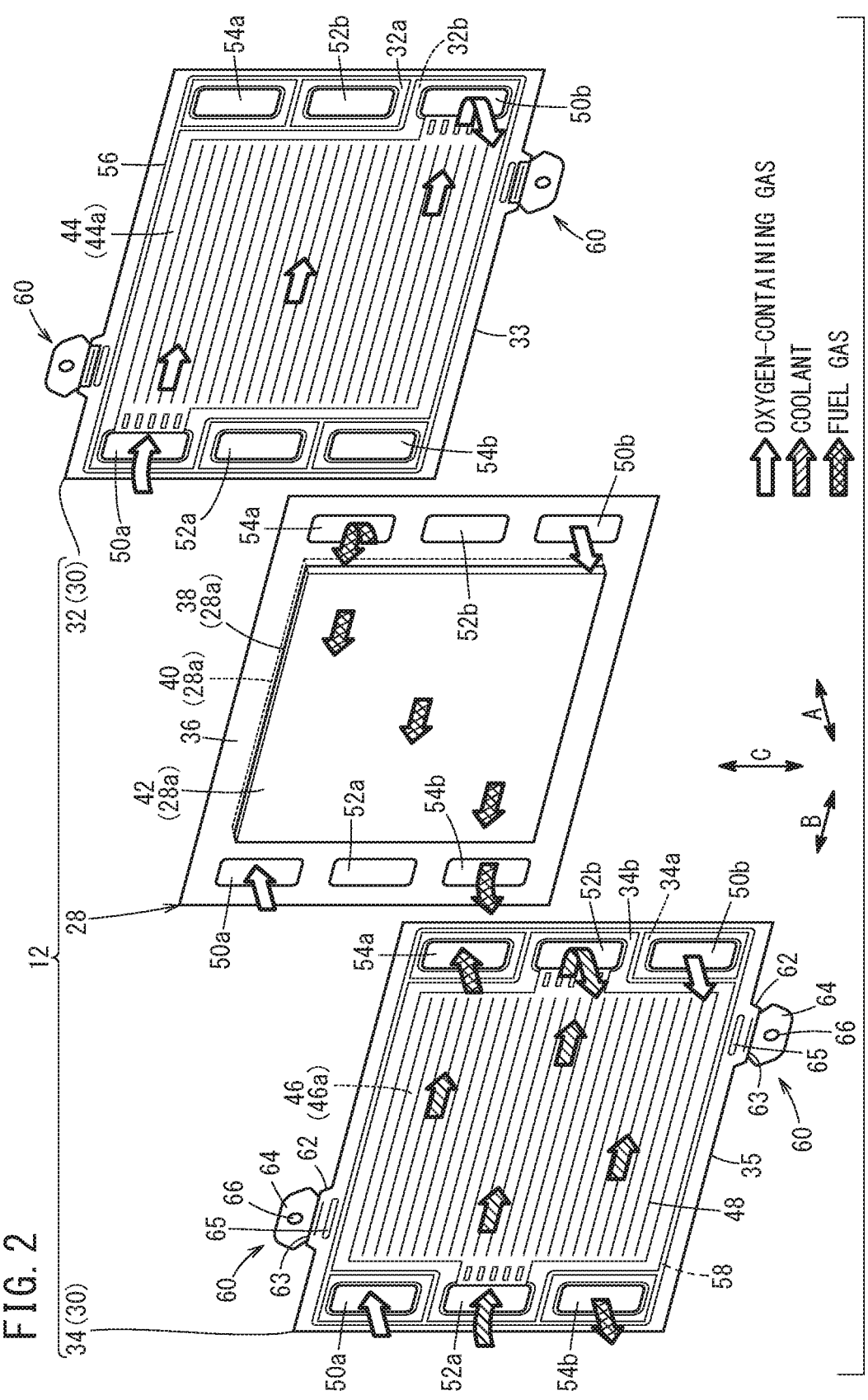
FIG. 2 is an exploded perspective view showing structure of a fuel cell stack.

As shown in FIG. 2, the power generation cell 12 of the fuel cell stack 10 includes a resin frame equipped MEA 28, and a pair of separators 32, 34 sandwiching the resin frame equipped MEA 28 (hereinafter the two separators 32, 34, will also be referred to as "separators 30", collectively). Specifically, the power generation cell 12 includes a first separator 32 disposed on one surface of the resin frame equipped MEA 28, and a second separator 34 disposed on the other surface of the resin frame equipped MEA 28.

The resin frame equipped MEA 28 of the power generation cell 12 includes a membrane electrode assembly 28a (hereafter referred to as the "MEA 28a") and a resin frame member 36 joined to an outer peripheral portion of the MEA 28a, and provided around the outer peripheral portion of the MEA 28a. Further, the MEA 28a includes an electrolyte membrane 38, a cathode 40 provided on one surface of the electrolyte membrane 38, and an anode 42 provided on the other surface of the electrolyte membrane 38. It should be noted that the resin frame member 36 need not necessarily be provided for the MEA 28a, and the electrolyte membrane 38 may protrude outward without using the resin frame member 36. A frame shaped film member may be used as the resin frame member 36.

For example, the electrolyte membrane 38 is a solid polymer electrolyte membrane (cation ion exchange membrane) which is a thin membrane of perfluorosulfonic acid containing water. A fluorine based electrolyte may be used as the electrolyte membrane 38. Alternatively, an HC (hydrocarbon) based electrolyte may be used as the electrolyte membrane 38. Further, though not shown, each of the anode 42 and the cathode 40 includes a gas diffusion layer comprising a carbon paper, etc, and an electrode catalyst layer joined to the electrolyte membrane 38. The electrode catalyst layer is formed by paste containing porous carbon particles and ion exchange component deposited uniformly on the surface of the gas diffusion layer, and platinum alloy supported on the surfaces of the porous carbon particles.

The resin frame member 36 is provided around the MEA 28a to facilitate cost reduction of the electrolyte membrane 38, and suitably adjust the contact pressure between the MEA 28a and the first and second separators 32, 34 to achieve the desired sealing performance. For example, the resin frame member 36 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The first separator 32 includes an oxygen-containing gas flow field 44 on a surface 32a facing the cathode 40 of the resin frame equipped MEA 28, for allowing an oxygen-containing gas as one of reactant gases to flow along the oxygen-containing gas flow field 44. The oxygen-containing gas flow field 44 comprises straight flow grooves or wavy flow grooves formed between a plurality of ridges 44a extending along the first separator 32 in the direction indicated by the arrow B.

The second separator 34 includes a fuel gas flow field 46 on its surface 34a facing the anode 42 of the resin frame equipped MEA 28, for allowing a fuel gas as the other of the reactant gases to flow along the fuel gas flow field 46 (in FIG. 2, for convenience, the flow direction of the fuel gas is shown on the anode 42 of the MEA 28a). The fuel gas flow field 46 includes a plurality of straight flow grooves or wavy flow grooves formed between a plurality of ridges 46a extending along the second separator 34 in the direction indicated by the arrow B.

Further, a coolant flow field 48 is provided between a surface 32b of the first separator 32 and a surface 34b of the second separator 34, for allowing a coolant (e.g., water) to flow along the coolant flow field 48. When the first separator 32 and the second separator 34 are stacked together, the coolant flow field 48 is formed between the back surface of the oxygen-containing gas flow field 44 of the first separator 32 and the and the back surface of the fuel gas flow field 46 of the second separator 34.

At one end of the first and second separator 32, 34, and the resin frame member 36 in the longitudinal direction (indicated by the arrow B), an oxygen-containing gas supply passage 50a, a coolant supply passage 52a, and a fuel gas discharge passage 54b are provided, respectively. The oxygen-containing gas supply passage 50a, the coolant supply passage 52a, and the fuel gas discharge passage 54b extend through the first and second separators 32, 34 and the resin frame member 36 in the stacking direction indicated by the arrow A. The oxygen-containing gas supply passage 50a, the coolant supply passage 52a and the fuel gas discharge passage 54b are arranged in the lateral direction indicated by the arrow C. The oxygen-containing gas is supplied through the oxygen-containing gas supply passage 50a to the oxygen-containing gas flow field 44. The coolant is supplied through the coolant supply passage 52a to the coolant flow field 48. The fuel gas is discharged from the fuel gas flow field 46 through the fuel gas discharge passage 54b.

At the other end of the first and second separators 32, 34 and the resin frame member 36 in the longitudinal direction indicated by the arrow B, a fuel gas supply passage 54a, a coolant discharge passage 52b, and an oxygen-containing gas discharge passage 50b are provided. The fuel gas supply passage 54a, the coolant discharge passage 52b, and the oxygen-containing gas discharge passage 50b extend through the first and second separators 32, 34 and the resin frame member 36 in the stacking direction. The fuel gas supply passage 54a, the coolant discharge passage 52b, and the oxygen-containing gas discharge passage 50b are arranged in the lateral direction indicated by the arrow C. The fuel gas is supplied to the fuel gas flow field 46 through the fuel gas supply passage 54a. The coolant is discharged from the coolant flow field 48 through the coolant discharge passage 52b. The oxygen-containing gas is discharged from the oxygen-containing gas flow field 44 through the oxygen-containing gas discharge passage 50b.

The oxygen-containing gas supply passage 50a, the oxygen-containing gas discharge passage 50b, the fuel gas supply passage 54a, the fuel gas discharge passage 54b, the coolant supply passage 52a, and the coolant discharge passage 52b penetrate through the structure part (the terminal plate 22a, the insulator 23a, the end plate 24a) at one end of the stack body 14 in the stacking direction, and are connected to pipes (not shown) connected to the end plate 24a. The layout and the shape of the oxygen-containing gas supply passage 50a, the oxygen-containing gas discharge passage 50b, the fuel gas supply passage 54a, the fuel gas discharge passage 54b, the coolant supply passage 52a, and the coolant discharge passage 52b are not limited to the illustrated embodiment, and may be changed as necessary depending on the required specification of the fuel cell stack 10.

Further, a first bead 56 is formed on the surface 32a of the first separator 32 by press forming. The first bead 56 protrudes toward the resin frame equipped MEA 28, and contacts the resin frame member 36 to form a seal (bead seal). The first bead 56 is formed around the oxygen-containing gas flow field 44, and surrounds the fuel gas supply passage 54a, the fuel gas discharge passage 54b, the coolant supply passage 52a, and the coolant discharge passage 52b, respectively, to prevent flow of the fuel gas and/or the coolant into the oxygen-containing gas flow field 44.

A second bead 58 is formed on the surface 34a of the second separator 34 by press forming. The second bead 58 protrudes toward the resin frame equipped MEA 28, and contacts the resin frame member 36 to form a seal (bead seal). The second bead 58 is formed around the fuel gas flow field 46, and surrounds the oxygen-containing gas supply passage 50a, the oxygen-containing gas discharge passage 50b, the coolant supply passage 52a, and the coolant discharge passage 52b, respectively, to prevent flow of the oxygen-containing gas and/or the coolant into the fuel gas flow field 46.

Each of the separators 30 (first and second separators 32, 34) is an electrically conductive metal separator formed by press forming of, e.g., a steel plate, a stainless steel plate, an aluminum plate, a plated steel plate, or a metal thin plate having an anti-corrosive surface by surface treatment to have a corrugated shape in cross section. It should be noted that as the separators 30, carbon separators made of carbon material or mixed material of carbon and resin may be used.

Further, insulating resin material may be provided in outer marginal portions 33, 35 of the first and second separators 32, 34.

The first separator 32 and the second separator 34 are joined together by a joining method such as welding, brazing, crimping, etc. to form a joint separator. At the time of producing the plurality of power generation cells 12, the joint separators and the resin frame equipped MEAs 28 are stacked together alternately, to form structure of repeating the oxygen-containing gas flow field 44 between the first separator 32 and the resin frame equipped MEA 28, the fuel gas flow field 46 between the resin frame equipped MEA 28 and the second separator 34, and the coolant flow field 48 between the first separator 32 and the second separator 34 in this order.

Figure 3:
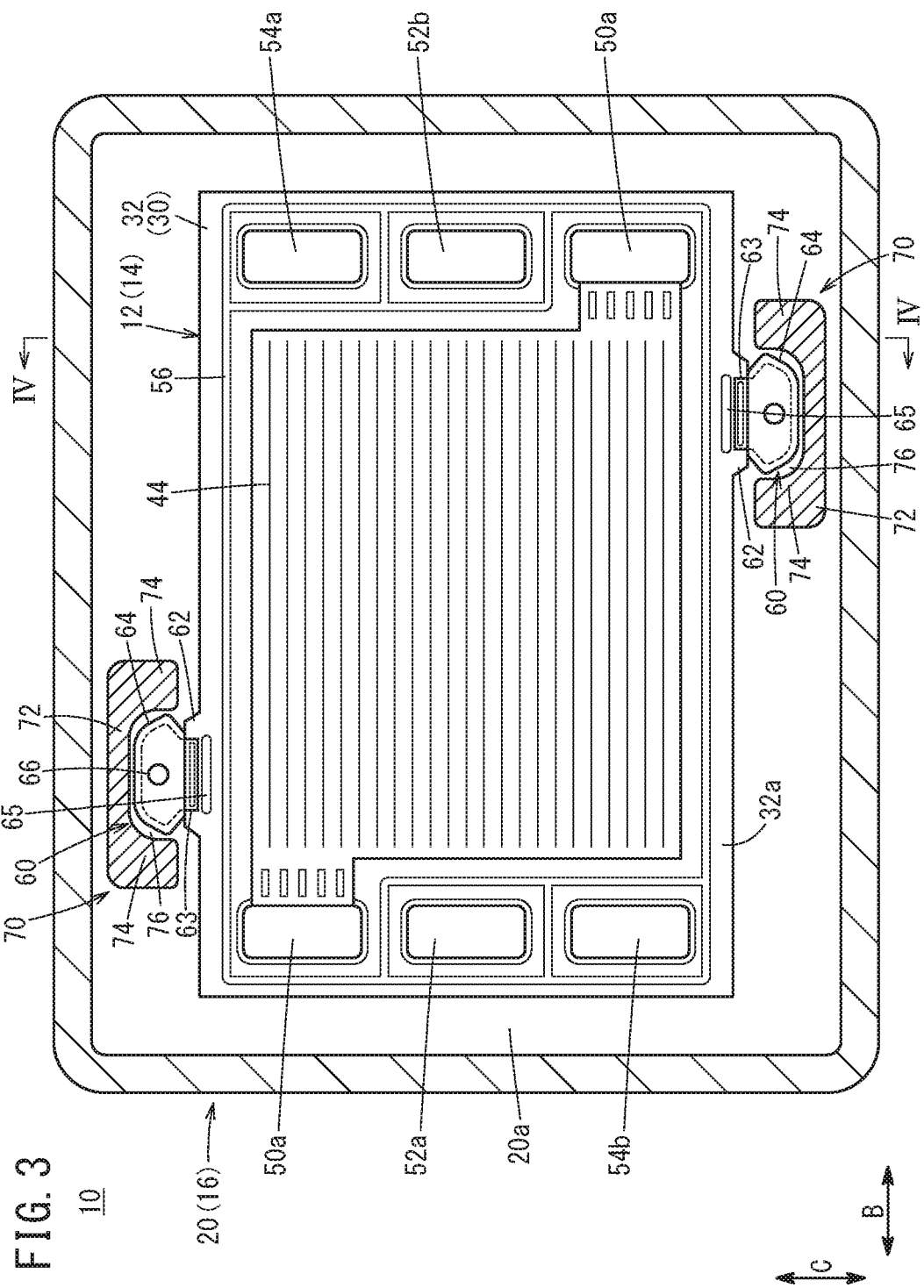
FIG. 3 is a cross sectional view showing the fuel cell stack in a state where the power generation cell and support bars are accommodated in a case body.

Further, as shown in FIGS. 1 to 3, a plurality of tabs (protrusion pieces) 60 (e.g., a pair of tabs 60) are provided in the outer marginal portions 33, 35 of the separators 30 (first and second separators 32, 34) of the power generation cells 12, respectively. The plurality of tabs 60 are provided on the upper side and the lower side (long sides) of the first and second separators 32, 34. The tab 60 on the upper side is provided at a position shifted toward one side from the center in the direction indicated by the arrow B, and the tab 60 on the lower side is provided at a position shifted toward the other side from the center in the direction indicated by the arrow B. It should be noted that the positions of the tabs 60 in the outer marginal portions 33, 35 are not limited specially.

Each of the tabs 60 includes a support 62, a load receiver 64, and a rib 65. The support 62 has a trapezoidal shape, and the support 62 is formed integrally with the outer marginal portion 33, 35 of the separator 30 by press forming, in a manner to protrude outward from the outer marginal portion 33, 35 in the direction indicated by the arrow C). The rib 65 is formed in the support 62. The rib 65 is part of the separator 30 protruding in the stacking direction, and extending in the width direction of the support 62 (indicated by the arrow B).

The load receiver 64 is joined to the support 62 through a joint part 63. Each of both ends of the load receiver 64 in the width direction has a substantially triangular shape, and has a symmetrical shape about the central line in the width direction (indicated by the arrow B). A positioning hole 66 is formed at the center of the load receiver 64. A rod (not shown) is inserted into the positioning hole 66, for positioning the plurality of power generation cells 12 at the time of producing the fuel cell stack 10.

The load receiver 64 comprises a metal thin plate, and the outer portion of the load receiver 64 and the inner circumferential portion of the positioning hole 66 are made of insulating resin material. As long as the resin material of the load receiver 64 has electrically insulating performance, the resin material is not limited specially. For example, polycarbonate, polyphenylene sulfide, polysulfone, fluororesin, or the same material as that used for the insulators 23a, 23b may be used. It should be noted that the structure of the tab 60 is not limited specially. For example, the support 62 and the load receiver 64 may be formed integrally with each other. The load receiver 64 may have any shape such as a rectangular shape, a trapezoidal shape, etc. The load receiver 64 is joined to the support 62 by brazing, welding, etc.

In the state where the plurality of power generation cells 12 (separators 30) are stacked together, the tabs 60 of the power generation cells 12 form a tab array 68 arranged on each of an upper surface and a lower surface of the stack body 14. The fuel cell stack 10 includes support bars 70 each having a recess 76 which can accommodate the tab array 68

(plurality of tabs 60). The tabs 60 and the support bar 70 are engaged with each other to form structure of preventing lateral displacement of the separators 30 (first and second separators 32, 34) of each of the power generation cells 12.

The support bar 70 includes a proximal part 72, and a pair of projections 74 protruding in the same direction from both ends of the proximal part 72 in the width direction. As shown in FIG. 1, the entire length of the proximal part 72 and the pair of projections 74 is substantially the same as the length of the case body 20 in the direction indicated by the arrow A (stacking direction of the power generation cells 12). The material of the support bar 70 is not limited especially as along as the support bar 70 has suitable rigidity which makes it possible to receive the load in the width direction of the tabs 60. Metal material having rigidity which is lower than that of the conventional coupling member which applies the tightening load to the stack body 14 may be used. For example, metal material such as aluminum, iron may be used as material of the support bar 70. It should be noted that the support bar 70 may be made of insulating resin material, or formed by covering a metal body with an insulating resin member. In this case, the tab 60 may be made of metal material.

As shown in FIGS. 1 and 3, the recess 76 surrounded by the proximal part 72 and the pair of projections 74 is provided in a part of the support bar 70 facing the stack body 14. The recess 76 is a laterally elongated groove having an R (rounded) shape at corners of the bottom in a cross sectional view. The recess 76 is formed over the entire length in a direction in which the support bar 70 extends (indicated by the arrow A).

In the state where the fuel cell stack 10 is assembled, the outer portion of each of the tabs 60 is disposed in non-contact with the support bar 70 in the recess 76. That is, the protruding end of the tab 60 in the direction indicated by the arrow C faces the bottom surface (proximal part 72) of the recess 76 through a clearance. Further, when no external load is applied to the fuel cell stack 10, both sides of the tab 60 in the width direction face the pair of projections 74 of the recess 76 with a minute clearance.

Figure 4:
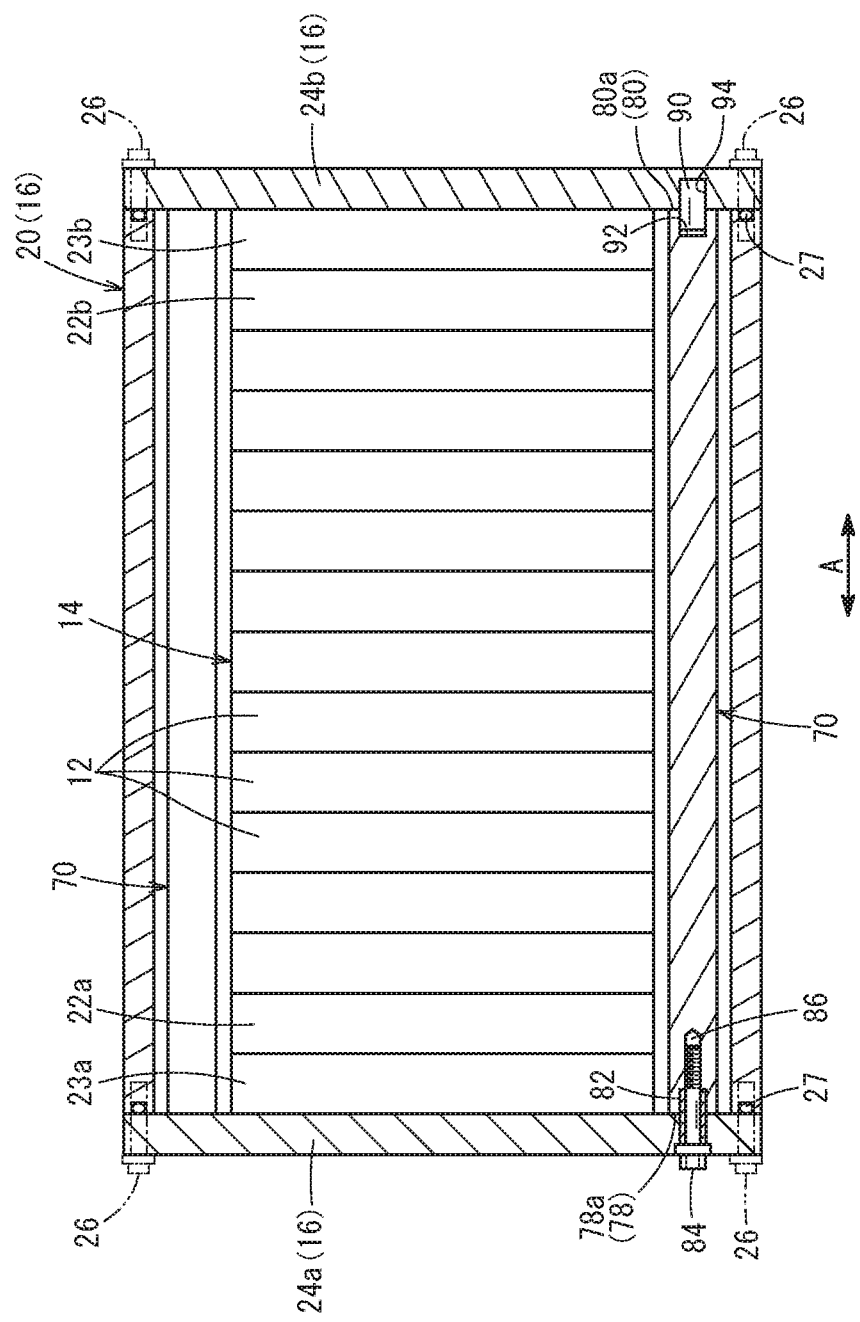
FIG. 4 is a cross sectional view taken along a line IV-IV in FIG. 3.

Then, as shown in FIG. 4, in the support bar 70 according to the embodiment of the present invention, one end 78 in the stacking direction of the stack body 14 is joined to the end plate 24a, and another end 80 in the stacking direction of the stack body 14 is supported by the end plate 24b. Hereinafter, the joining structure at the one end 78 of the support bar 70, and the support structure at the other end 80 of the support bar 70 will be described in detail. In the following description, though the support bar 70 provided under the stack body 14 will be taken as an example, it is a matter of course that the support bar 70 provided above the stack body 14 has the same structure.

Figure 5:
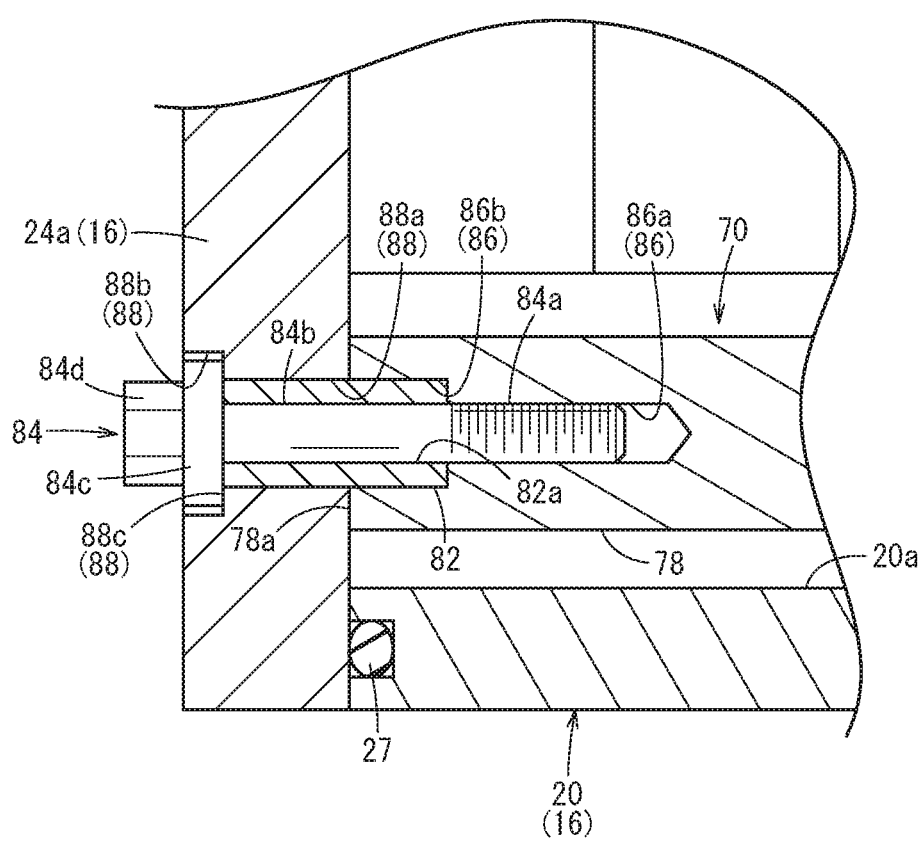
FIG. 5 is a cross sectional view enlarging a portion where one end of the support bar is joined.

As shown in FIGS. 1 and 5, the one end 78 of the support bar 70 is fastened to the end plate 24a using a pair of hollow knock pins 82 and a pair of fastening bolts 84. For this purpose, a pair of joining holes 86 are formed in one end surface 78a of the one end 78, for insertion of the hollow knock pins 82 and the fastening bolts 84 into the pair of joining holes 86. Further, a pair of holes 88 are formed in the end plate 24a, for insertion of the hollow knock pins 82 and the fastening bolts 84 into the holes 88. The number of the hollow knock pins 82 and the number of the fastening bolts 84 used herein is not limited specially. Two or more hollow knock pins 82 and two or more fastening bolts 84 may be used. It is adequate that the joining holes 86 and the holes 88 are formed in correspondence with the number of the used hollow knock pins 82 and the number of the used fastening bolts 84.

The hollow knock pin 82 has a cylindrical shape having an internal through hole 82a. The hollow knock pin 82 is disposed to be inserted into both of the joining hole 86 (knock pin area 86b) and the hole 88 (knock pin area 88a), and in the state where the support bar 70 and the end plate 24a are joined together, the hollow knock pin 82 tightly contacts the joining hole 86 and the hole 88. Further, the inner circumferential surface of the through hole 82a of the hollow knock pin 82 is formed to have an inner diameter which allows a clearance to be formed between the inner circumferential surface of the hollow knock pin 82 and the outer circumferential surface of the fastening bolt 84.

The fastening bolt 84 includes a male screw portion 84a at its front end in the insertion direction, and a non-threaded smooth portion 84b on the proximal end side of the male screw portion 84a. The length of the smooth portion 84b is determined to have substantially the same as the length of the hollow knock pin 82 in the axial direction. The proximal end side of the smooth portion 84b is made up of a flange 84c and a head 84d of the fastening bolt 84. The flange 84c protrudes outward in the radial direction beyond the outer shape of the hollow knock pin 82.

The joining hole 86 of the support bar 70 includes a female screw area 86a disposed on the deep side, capable of being screwed with the male screw portion 84a of the fastening bolt 84, and the knock pin area 86b disposed on the one end surface 78a side where the hollow knock pin 82 is disposed partially. The diameter of the knock pin area 86b is larger than the diameter of the female screw area 86a. That is, the joining hole 86 includes a step in the axial direction.

On the other hand, the hole 88 of the end plate 24a includes the knock pin area 88a formed to have the same inner diameter as the knock pin area 86b of the joining hole 86, and a flange space 88b where the flange 84c of the fastening bolt 84 is disposed. The diameter of the flange space 88b is larger than the diameter of the knock pin area 88a. The hole 88 includes a stepped surface 88c pressed by the flange 84c. It should be noted that the joining hole 86 need not necessarily include the flange space 88b or the stepped surface 88c, and may be made up of only the knock pin area 88a, over the entire area in the thickness direction of the end plate 24a.

That is, the joining hole 86 and the hole 88 are holes having substantially the same shape as the outer shape formed by assembling the hollow knock pin 82 and the fastening bolt 84 together (state where the hollow knock pin 82 is positioned on the smooth portion 84b of the fastening bolt 84). Therefore, the one end 78 of the support bar 70 is joined to the end plate 24a without any clearance.

Figure 6:
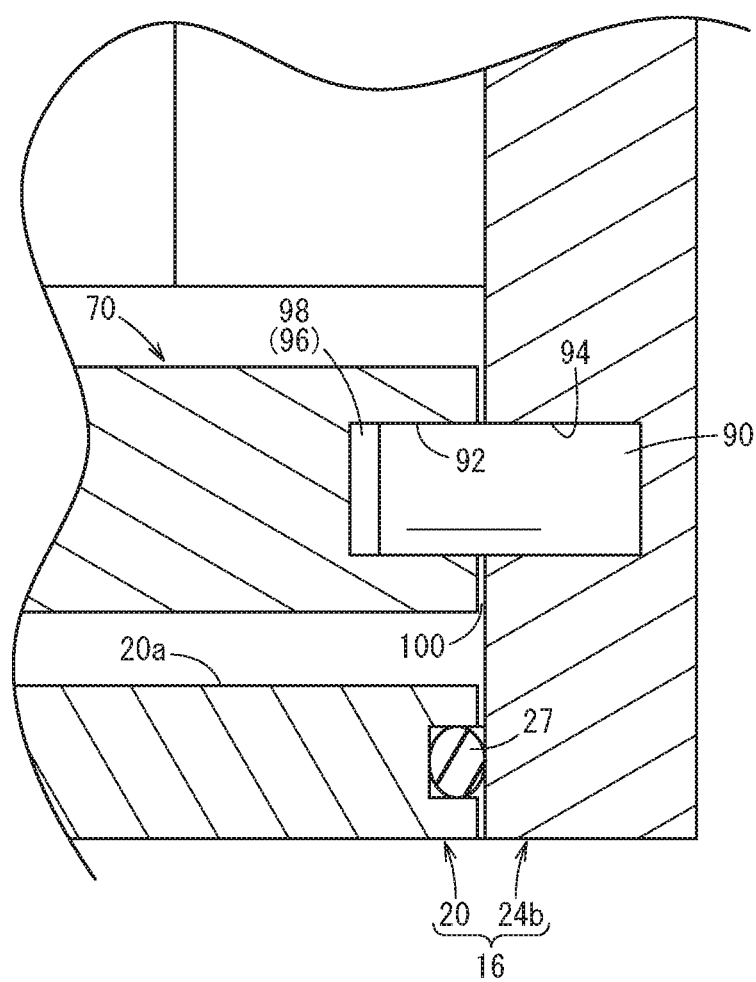
FIG. 6 is a cross sectional view enlarging a portion where the other end of the support bar is supported.

As shown in FIGS. 4 and 6, the other end 80 of the support bar 70 is supported by the end plate 24b using a pair of solid pins 90. In the specification, the "support(ing)" herein means that the support bar 70 is supported by the end plate 24b through the pins 90 which are movable in the axial direction and immovable in the radial direction. When the support bar 70 is supported, the support bar 70 can be in non-contact with the end plate 24a. Further, a pair of first holes 92 are formed in another end surface 80a of the other end 80, for insertion of the pair of pins 90 into the first holes 92. On the other hand, a pair of second holes 94 are formed in the end plate 24b, for insertion of the pair of pins 90 into the pair of second holes 94. It should be noted that the number of the pins 90 herein is not limited specially, as long as at least one pin 90 is used. It is adequate that the first holes 92 and the second holes 94 are formed depending on the number of used pins 90. The pins 90 may have a hollow shape.

The pin 90 has a circular column shape having a length in the axial direction which is shorter than the entire length of the fastening bolt 84. The outer diameter of the pin 90 is substantially the same as the outer diameter of the hollow knock pin 82.

The inner diameter of the first hole 92 of the support bar 70 and the inner diameter of the second hole 94 of the end plate 24b are formed such that the support bar 70 and the end plate 24b tightly contact the outer circumferential surface of the pin 90. The depth (length in the axial direction) of the first hole 92 and the depth (length in the axial direction) of the second hole 94 are shorter than the length of the pin 90 in the axial direction. In particular, the second hole 94 is formed such that the second hole 94 does not penetrate through the outer surface of the end plate 24b.

The first hole 92 and the second hole 94 face each other to form a bag shape (closed space 96) into which the pin 90 can be inserted. The length of the closed space 96 formed by combining the first hole 92 and the second hole 94 in the axial direction (indicated by the arrow A) is longer than the length of the pin 90 in the axial direction. Therefore, in the state where the pin 90 is inserted into the closed space 96, a clearance 98 is formed in the closed space.

It should be noted that the clearance 98 may not be present in the closed space 96. Further, the second hole 94 may penetrate through the end plate 24b. In this case, it is adequate that a member which closes the second hole 94 is fitted to the end plate 24b. Moreover, in the state where the support bar 70 is supported by the end plate 24b through the pins 90, a minute (of at least 10 μm) clearance 100 is formed between the end surface of the other end 80 and the end plate 24b. That is, the support bar 70 is configured not to apply any tightening load to the stack body 14.

The fuel cell stack 10 according to the embodiment of the present invention basically has the above structure. Next, operation of the fuel cell stack 10 will be described.

At the time of producing the fuel cell stack 10 shown in FIG. 1, the case body 20 of the stack case 16 is formed by a production method such as extrusion, casting, etc. Thereafter, the body side screw hole 20c, etc. for fixing the end plate 24a and the end plate 24b are formed in the one end surface and the other end surface of the case body 20. Further, the end plates 24a, 24b, and the support bar 70 are formed by a suitable production method such as casting, forging, machining, etc.

On the other hand, the stack body 14 is formed by stacking the resin frame equipped MEA 28, the joint separators (first and second separators 32, 34) together, and stacking the terminal plates 22a, 22b, and the insulators 23a, 23b at both ends in the stacking direction. Further, in the state where the plurality of power generation cells 12 are stacked together, the tabs 60 form the tab array 68. In the state where the tab array 68 is accommodated in the recess 76, the support bar 70 and the stack body 14 are accommodated in the case body 20.

Assembling of the support bar 70 to the stack case 16 and fixing of the pair of end plates 24a, 24b are performed at the same time. Specifically, at one end of the stack case 16, while the end plate 24a is fixed to the case body 20, the one end 78 of the support bar 70 is joined to the end plate 24a.

As shown in FIG. 5, at the time of joining the end plate 24a and the support bar 70 together, the hollow knock pins 82 are inserted to the joining holes 86 (knock pin areas 86b) of the support bar 70. One end of each of the pair of hollow knock pins 82 is inserted into the support bar 70 by substantially the half length in the axial direction, and the other end of each of the pair of hollow knock pins 82 is exposed from the support bar 70. The exposed portions of the pair of hollow knock pins 82 are fitted to the pair of holes 88 of the end plate 24a. In this manner, the joining holes 86 and the holes 88 are positioned while aligned with each other.

Then, the fastening bolts 84 are inserted from the outer surface of the end plate 24a through the through holes 82a of the hollow knock pins 82 into the deep side of the hollow knock pins 82, and the male screw portions 84a of the fastening bolts 84 are screwed into the female screw areas 86a of the joining holes 86. As a result, the fastening bolts 84 are inserted through the end plate 24a, and firmly fastened to the support bar 70.

Further, at the other end of the stack case 16, the end plate 24b is fixed to the case body 20, and the other end 80 of the support bar 70 is supported by the end plate 24b. In this case, as shown in FIG. 6, the pins 90 are inserted into the pair of first holes 92 of the support bar 70, respectively. One end of each of the pair of pins 90 is inserted into the support bar 70 by substantially the half length in the axial direction, and the other end of each of the pair of pins 90 is exposed from the support bar 70. The pair of exposed pins 90 are fitted to the second holes 94 of the end plate 24b. In this manner, the first holes 92 and the second holes 94 are positioned while aligned with each other. In this state, the case body 20 and the end plate 24b are fastened together using the bolts 26. It should be noted that, before fastening the end plate 24b, the thickness of a shim (not shown) provided between the end plate 24b and the insulator 23b is adjusted in order to adjust the tightening load applied to the stack body 14. As a result, production of the stack case 16 containing the stack body 14 is finished.

As shown in FIG. 3, in the fuel cell stack 10, the tab 60 of each of the power generation cells 12 is disposed in the recess 76 of the support bar 70. In the structure, for example, even if the fuel cell automobile receives an impact from the direction indicated by the arrow B, and an impact load is applied to the fuel cell stack 10, since the tabs 60 are engaged with the recess 76 of the support bar 70, lateral displacement of the power generation cells 12 is prevented.

As shown in FIG. 2, in the fuel cell stack 10, an oxygen-containing gas is supplied to the oxygen-containing gas supply passage 50a, a fuel gas is supplied to the fuel gas supply passage 54a, and a coolant is supplied to the coolant supply passage 52a through pipes (not shown) coupled to the end plate 24a to perform power generation.

The oxygen-containing gas is supplied from the oxygen-containing gas supply passage 50a to the oxygen-containing gas flow field 44 of the first separator 32. The oxygen-containing gas flows along the oxygen-containing gas flow field 44 in the direction indicated by the arrow B, and the oxygen-containing gas is supplied to the cathode 40 of the MEA 28a.

In the meanwhile, the fuel gas flows from the fuel gas supply passage 54a into the fuel gas flow field 46 of the second separator 34. The fuel gas flows along the fuel gas flow field 46 in the direction indicated by the arrow B, and the fuel gas is supplied to the anode 42 of the MEA 28a.

In each of the MEAs 28a, power generation is performed by electrochemical reactions of the oxygen-containing gas supplied to the cathode 40 and the fuel gas supplied to the anode 42. The oxygen-containing gas supplied to the cathode 40 is partially consumed at the cathode 40, and then, flows from the oxygen-containing gas flow field 44 to the oxygen-containing gas discharge passage 50b. The oxygen-containing gas is discharged along the oxygen-containing gas discharge passage 50b. Likewise, the fuel gas supplied to the anode 42 is partially consumed at the anode 42, and then, flows from the fuel gas flow field 46 to the fuel gas discharge passage 54b. The fuel gas is discharged along the fuel gas discharge passage 54b.

Further, the coolant supplied to the coolant supply passage 52a flows into the coolant flow field 48 formed between the first separator 32 and the second separator 34, and then, the coolant flows in the direction indicated by the arrow B. After the coolant cools the MEA 28a, the coolant is discharged from the coolant discharge passage 52b.

Further, as shown in FIGS. 5 and 6, in the fuel cell stack 10, the hollow knock pins 82 and the pins 90 are present between border portions between the pair of end plates 24a, 24b and the support bar 70. The hollow knock pins 82 position the end plate 24a and the support bar 70 in the radial direction. The fastening bolts 84 are inserted into the hollow knock pins 82 to fasten the end plate 24a and the support bar 70 together. Further, while the pins 90 position the end plate 24b and the support bar 70 in the radial direction, the pins 90 do not transmit the load in the axial direction of the end plate 24b to the support bar 70.

It should be noted that the fuel cell stack 10 according to the embodiment of the present invention is not limited to the above embodiment. Various modifications can be made in line with the gist of the invention. For example, the case body 20 is not limited to the one-piece structure object including the ceiling plate, the pair of side plates, and the bottom plate that are formed integrally. The case body 20 may be formed by joining a plurality of plates together (dividable structure).

The technical concept and advantages understood from the above embodiment will be described below.

In the fuel cell stack 10, the one end 78 of the support bar 70 is joined to the end plate 24a, and the other end 80 of the support bar 70 is supported by the end plate 24b. As a result, the fuel cell stack 10 has structure where the support bar 70 does not apply the tightening load to the stack body 14. That is, when the fuel cell stack 10 receives a load, the support bar 70 is engaged with the tabs 60 of the power generation cell 12 to have a dedicated function of suppressing lateral displacement of the separators 30 of the power generation cells 12. Accordingly, the support bar 70 is simplified to a greater extent, and for example, it becomes possible to reduce the rigidity of the support bar 70 to achieve weight reduction.

Further, the stack case 16 is formed by fastening the pair of end plates 24a, 24b to the rectangular cylindrical case body 20 containing the plurality of power generation cells 12 to apply the tightening load to the plurality of power generation cells 12 disposed between the pair of end plates 24a, 24b. Accordingly, the plurality of power generation cells 12 do not receive the tightening load by the support bar 70, and the tightening load is applied stably to the plurality of power generation cells 12 from the case body 20 fastened by the pair of end plates 24a, 24b.

Further, the one end 78 of the support bar 70 is joined to the end plate 24a (one of the end plates 24a, 24b) by the hollow knock pin 82 including the through hole 82a penetrating through the hollow knock pin 82 in the axial direction, and the fastening bolt 84 penetrating through the through hole 82a. As a result, the structure of joining the end plate 24a and the support bar 70 is simplified to a greater extent, and it is possible to reduce the number of component parts.

Further, the other end 80 of the support bar 70 is supported by the other end plate 24b (the other of the end plates 24a, 24b) by the pin 90 inserted into both of the support bar 70 and the other end plate 24b. Accordingly, the support structure of the end plate 24b and the support bar 70 is simplified to a greater extent, and it is possible to reduce the number of component parts.

Further, the support bar 70 includes the first hole 92 into which the pin 90 is inserted, the other end plate 24b includes the second hole 94 into which the pin 90 is inserted, and the first hole 92 and the second hole 94 form the closed space 96. In the structure, it is possible to reliably prevent leakage of gases from the support structure of the end plate 24b and the support bar 70.

Further, the support bar 70 is provided in each of the pair of opposing sides of the power generation cells 12 having the rectangular shape. In the structure, when the fuel cell stack 10 receives a load, the support bars 70 are brought into engagement with the tabs 60 of the pair of opposing sides of the power generation cells 12. Therefore, it is possible to prevent lateral displacement of the separators 30 more reliably.

Further, the clearance 100 is formed between the end surface of the other end of the support bar 70 and the end plate 24b (the other of the end plates 24a, 24b). Accordingly, in the fuel cell stack 10, it is possible to more reliably realize structure where the tightening load is not applied to the stack body 14 through the end plates 24a, 24b and the support bar 70. Accordingly, it is possible to facilitate size reduction of the support bar 70.

What is claimed is:

1. A fuel cell stack comprising:
   a stack body including a plurality of power generation cells each having a tab, the tab protruding from an outer marginal portion of each of the power generation cells;
   a stack case containing the plurality of power generation cells that are stacked together in a stacking direction, and including a pair of end plates provided at both ends of the stack body in the stacking direction;
   a support bar extending inside the stack case in the stacking direction, and including a recess configured to accommodate the tab, the stack body being held between the pair of end plates in a manner that a tightening load is applied to the stack body,
   wherein one end of the support bar in the stacking direction is joined to one of the end plates; and
   another end of the support bar in the stacking direction is supported by another of the end plates, and
   wherein a clearance is formed between an end surface of the other end of the support bar and the other of the end plates.

2. The fuel cell stack according to claim 1, wherein the stack case is formed by fastening the pair of end plates to a cylindrical case body containing the plurality of power generation cells to apply a tightening load to the plurality of power generation cells disposed between the pair of end plates.

3. The fuel cell stack according to claim 1, wherein the one end of the support bar is joined to the one of the end plates by a hollow knock pin including a through hole penetrating through the hollow knock pin in an axial direction and a fastening bolt penetrating through the through hole.

4. The fuel cell stack according to claim 1, wherein the other end of the support bar is supported by the other of the end plates by a pin inserted into both of the support bar and the other of the end plates.

5. The fuel cell stack according to claim 4, wherein the other end of the support bar includes a first hole into which one end of the pin in an axial direction of the pin is inserted;

the other of the end plates includes a second hole into which another end of the pin in the axial direction of the pin is inserted; and the first hole and the second hole form a closed space.

6. The fuel cell stack according to claim 1, wherein the support bar includes a first support bar provided in one of a pair of the opposing sides of the power generation cells having a rectangular shape, and a second support bar provided in another of the pair of the opposing sides of the power generation cells.

\* \* \* \* \*